United States Patent
Gillies et al.

(10) Patent No.: US 8,398,470 B2
(45) Date of Patent: Mar. 19, 2013

(54) GAME WITH PROGRAMMABLE LIGHT EMITTING SEGMENTS

(75) Inventors: Murray Fulton Gillies, Eindhoven (NL); Anthonie Hendrik Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 981 days.

(21) Appl. No.: 12/090,495

(22) PCT Filed: Oct. 17, 2006

(86) PCT No.: PCT/IB2006/053814
§ 371 (c)(1),
(2), (4) Date: Apr. 17, 2008

(87) PCT Pub. No.: WO2007/046056
PCT Pub. Date: Apr. 26, 2007

(65) Prior Publication Data
US 2008/0237981 A1 Oct. 2, 2008

(30) Foreign Application Priority Data
Oct. 20, 2005 (EP) .................................. 05109768

(51) Int. Cl.
*A63F 9/24* (2006.01)
*A63F 13/00* (2006.01)

(52) U.S. Cl. .................. 463/9; 463/31; 463/35; 463/36; 463/37; 463/46; 273/153 R; 273/153 S; 273/460; 434/128

(58) Field of Classification Search .................. 273/460, 273/153 R, 157 R, 153 S; 463/36–37, 46–47
See application file for complete search history.

(56) References Cited

U.S. PATENT DOCUMENTS

| | | | | |
|---|---|---|---|---|
| 3,152,805 A | * | 10/1964 | McGinn | 273/237 |
| 3,778,063 A | * | 12/1973 | Strand | 273/237 |
| 4,398,720 A | * | 8/1983 | Jones et al. | 463/14 |
| 4,490,625 A | | 12/1984 | Dilly | |
| 4,575,087 A | * | 3/1986 | Sinclair | 273/153 R |
| 4,809,979 A | * | 3/1989 | Skowronski et al. | 463/9 |
| 4,817,952 A | * | 4/1989 | Biro et al. | 273/153 S |
| 4,957,291 A | * | 9/1990 | Miffitt et al. | 463/9 |
| 5,037,105 A | * | 8/1991 | Klein | 273/237 |
| 5,221,085 A | * | 6/1993 | Reed | 273/153 S |
| 5,251,899 A | * | 10/1993 | Reed | 273/153 S |

(Continued)

FOREIGN PATENT DOCUMENTS

| | | |
|---|---|---|
| DE | 9114059 U1 | 2/1992 |
| GB | 2416494 A | 2/2006 |

(Continued)

OTHER PUBLICATIONS

"Effect of the Cable Capacitance of Long Control Cables on the Actuation of Contractors" from www.eaton.com/moellerproducts Copyright 2005.*

*Primary Examiner* — Steven J Hylinski (57) ABSTRACT

A puzzle includes light emitting diodes integrated in the puzzle in order to achieve a high level of interaction between the user and the puzzle. The puzzle can adapt to the players needs by increasing or decreasing the difficulty level or by giving the user hints. The puzzle functions not only as a puzzle but may also function as an ambient light (or object) of programmable color point (and layout) when not in use as a puzzle.

17 Claims, 6 Drawing Sheets

U.S. PATENT DOCUMENTS

| | | | | |
|---|---|---|---|---|
| 5,332,221 | A * | 7/1994 | Reed | 273/153 S |
| 5,417,425 | A * | 5/1995 | Blumberg et al. | 273/153 R |
| 5,419,065 | A | 5/1995 | Lin | |
| 5,564,702 | A * | 10/1996 | Meffert | 273/153 R |
| 5,573,245 | A * | 11/1996 | Weiner et al. | 273/153 R |
| 5,603,500 | A * | 2/1997 | Olti et al. | 273/153 R |
| 5,921,864 | A * | 7/1999 | Walker et al. | 463/9 |
| 5,944,533 | A * | 8/1999 | Wood | 434/322 |
| 6,074,212 | A * | 6/2000 | Cogliano | 434/159 |
| 6,186,504 | B1 * | 2/2001 | Maxim | 273/153 S |
| 6,215,978 | B1 * | 4/2001 | Ruzic et al. | 434/311 |
| 6,273,421 | B1 * | 8/2001 | Thalheimer et al. | 273/161 |
| 6,463,257 | B1 * | 10/2002 | Wood | 434/308 |
| 6,648,647 | B2 * | 11/2003 | Wood et al. | 434/174 |
| 6,682,392 | B2 * | 1/2004 | Chan | 446/335 |
| 6,687,128 | B2 * | 2/2004 | Tokuhara | 361/724 |
| 6,716,031 | B2 * | 4/2004 | Wood et al. | 434/159 |
| 6,795,318 | B2 * | 9/2004 | Haas et al. | 361/729 |
| 6,882,824 | B2 * | 4/2005 | Wood | 434/308 |
| 6,997,773 | B1 * | 2/2006 | Dubois et al. | 446/175 |
| 7,184,718 | B2 * | 2/2007 | Newman et al. | 455/90.3 |
| 7,334,791 | B2 * | 2/2008 | Lindsey et al. | 273/146 |
| 7,351,148 | B1 * | 4/2008 | Rothschild et al. | 463/30 |
| 7,371,177 | B2 * | 5/2008 | Ellis et al. | 463/42 |
| 7,556,563 | B2 * | 7/2009 | Ellis et al. | 463/31 |
| 7,704,146 | B2 * | 4/2010 | Ellis | 463/31 |
| 2003/0003427 | A1 * | 1/2003 | Wood et al. | 434/174 |
| 2003/0139210 | A1 * | 7/2003 | Raben | 463/9 |
| 2004/0166479 | A1 * | 8/2004 | Wen et al. | 434/156 |
| 2004/0235547 | A1 * | 11/2004 | Vancura | 463/9 |

FOREIGN PATENT DOCUMENTS

| | | |
|---|---|---|
| WO | WO0015316 A2 | 3/2000 |
| WO | WO0115059 A2 | 3/2001 |

\* cited by examiner

GAME WITH PROGRAMMABLE LIGHT EMITTING SEGMENTS

FIELD OF THE INVENTION

This invention relates to physical puzzles having separate colored segments that can form a particular color pattern.

BACKGROUND OF THE INVENTION

There has long been a market for puzzles and games that are aimed at adults rather than young children. One area of the adult gaming market is 3D-puzzles. This is where the user has to solve a puzzle in 3 dimensions. The most famous of these puzzles is the Rubik's cube. This puzzle was invented in 1974 by Erno Rubik and challenges the user to align the segments of the cube so that each side is a homogenous color. This puzzle became a worldwide phenomenon in the 1980s and 100 million pieces were sold in the period 1980-82. Many other similar puzzles were introduced to cash-in on this market.

An example of a more recent puzzle is the 3D-pyramid. Like the Rubik's cube the aim of this puzzle is to arrange the segments in three dimensions so that all sides are a different homogeneous color. Unlike the Rubik's cube each segment is detachable and coupled to the neighboring segments via plastic slip connectors.

These puzzles can be fun for the user but if the desired end state cannot be reached, and there is no prospect of doing this, then interest is often lost and the puzzle is discarded. Conversely, if the puzzle is too easy then the user solves the puzzle and it is also discarded. Both of these scenarios can be assigned to the fact that the segments have fixed colors giving the puzzle only one difficulty level.

SUMMARY OF THE INVENTION

It is an object of the present invention to provide a physical puzzle made of colored segments wherein the color of a segment can easily be changed.

This object is achieved by a game according to a game comprising:
- a plurality of segments, each segment comprising a housing and a light module arranged inside said housing and arranged to receive a control signal and to emit light of a color that is dependent on said control signal;
- a processor arranged to control said light modules.

Preferably, the light module comprises solid-state light sources, such as light emitting diodes. Integration of diodes in the puzzle makes it possible that the segments of the puzzle can have changing colors. By controlling these colors by a processor, it is possible to give the user the possibility of asking for a hint or setting a certain difficulty level. Furthermore, it gives a puzzle designer an added degree of freedom and allows for the generation of new features.

In an embodiment, the segments can be rearranged in a certain order so as to solve a puzzle. The puzzle can for example be a 3-dimensional puzzle such as the Rubik's cube wherein the puzzle comprises 26 separate segments and a core mechanism arranged to hold together the segments.

The light module in the segments may comprise at least two light emitting diodes arranged to radiate light of different colors. In this way the segments can get different colors using a relatively simple electronic circuit.

In an embodiment, each of the segments comprises a battery. Alternatively, only one battery may be present which is arranged to supply power to all segments. Integration of power supply into the game is preferable since it obviates external power connections.

The battery may be a rechargeable battery. In this way, the game does not need to be opened up in order to put in new batteries.

In an embodiment, each of the segments comprises a transceiver arranged to transmit to and receive signals from other segments. This allows segments to communicate with other segments without the need for hard-wired connections or slip contacts. The transceivers may comprise a capacitive coupler. These couplers can be arranged inside the housing of the segments leaving the outside surface of the segments intact, thereby preventing damaging of the couplers, which is preferable with a puzzle wherein segments graze such as the Rubik cube.

In an embodiment, each segment comprises a processor arranged to control at least one light module inside said segment. Placing a processor inside each segment makes communication with a central processor unnecessary. Instead, communication with neighboring segments may be needed. This can be arranged by using for example the capacitive couplers described above.

In an embodiment, the processor comprises a memory arranged to store game rules. This comprises string "boundary conditions" of a game. For example, a Rubik's cube cannot be randomly mixed, which requires a severe set of rules. By storing rules, the processor possesses knowledge on how the user needs to solve the puzzle. So it can give hints to the user by for example, blinking certain lights.

The processor may be arranged to receive an input signal indicative of a reset of the game, a request for a hint, a trigger to start another game and/or a command for turning off the game.

In an embodiment, the processor is arranged to be programmed by a user by way of an external programming tool. This external tool may be used to program the processor giving the game a new set of rules resulting in a new puzzle with the same segments.

By integrating programmable hardware into the game, a puzzle can become interactive where the difficulty level can be adjusted either at the beginning of the play period or actively during the play period.

These and other aspects of the invention will be apparent from and elucidated with reference to the embodiments described hereinafter.

BRIEF DESCRIPTION OF THE DRAWINGS

Hereinafter, the invention will be explained with reference to some drawings which are intended to illustrate the invention and not to limit its scope, and wherein.

DESCRIPTION OF PREFERRED EMBODIMENTS

Figure 1:
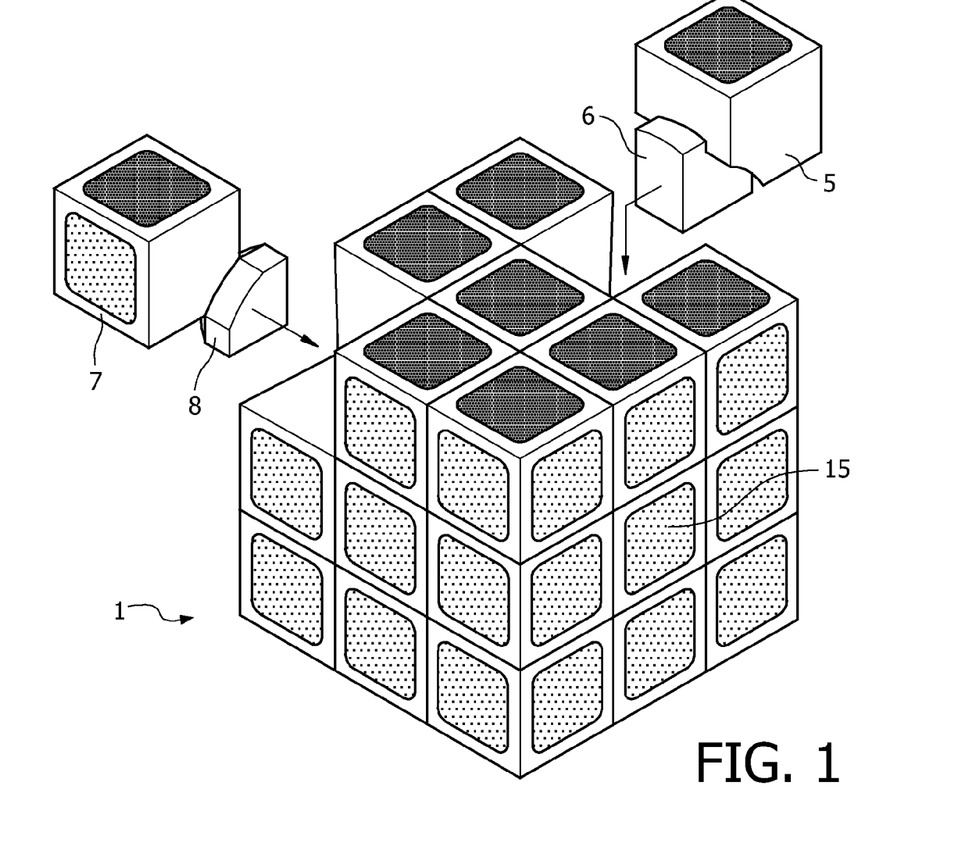
FIG. 1 schematically shows a puzzle according to an embodiment.

FIG. 1 shows an embodiment of the invention in which the game comprises a Rubik's Cube 1. Typically, the cube 1 measures approximately 5.4 cm on each side. The cube 1 may be made of plastic with its surface subdivided so that each face consists of nine squares. Each face can be rotated, giving the appearance of an entire slice of the cube 1 rotating upon itself. This gives the impression that the cube 1 is made up of 27 smaller cubes (3×3×3). In fact, the cube 1 is made of 26 individual segments held together by a core mechanism, which will be discussed later on with reference to FIG. 2. The cube 1 comprises twelve edge segments 5, one of them is extracted from the cube 1 to show its form, see FIG. 1. Each edge segment comprises a cubic housing and a projection 6. Furthermore, the cube 1 comprises eight corner segments 7, one of which is extracted from the structure to show its form. Each corner segment comprises a cubic housing and a projection 8. The cube 1 also comprises at each face a center segment 15.

Figure 2:
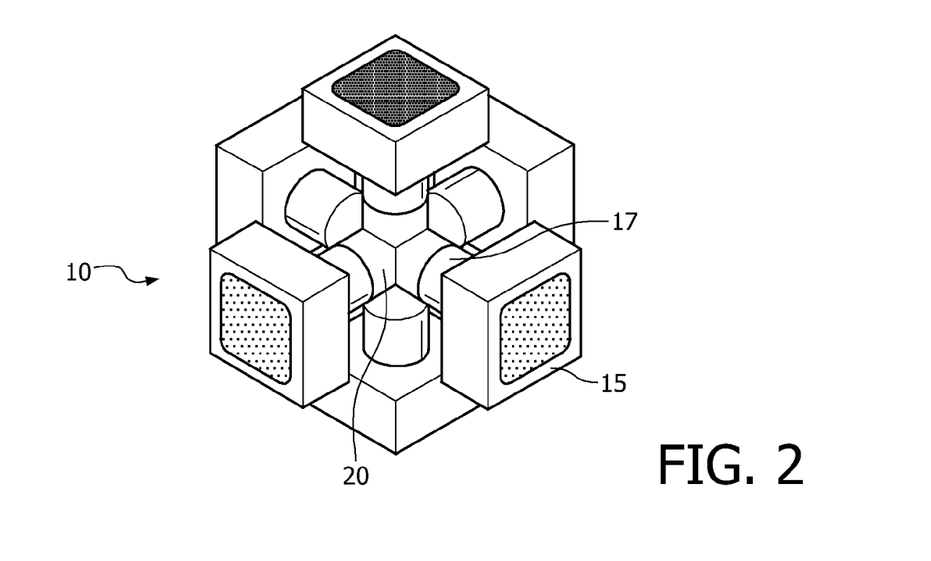
FIG. 2 shows the embodiment of FIG. 1 having all the edge and corner segments removed.

FIG. 2 shows the cube 1 having all the edge and corner segments 5, 7 removed. The cube 1 comprises a single core mechanism 20 of three intersecting axes, each holding two center segments 15 in place, which can rotate about their axis. Each center segment 15 comprises a tubular part 17 facing the core mechanism 20, wherein said tubular part 17 engages said core mechanism 20.

In its original state, each face of the cube 1 is a different color, but the rotation of each face allows the smaller cubes (i.e. the segments 5, 7, 15) to be rearranged in many different ways. The location of the segments 5, 7, 15 relative to one another can be altered by twisting an outer third of the cube 1 90 degrees, 180 degrees or 270 degrees. The challenge is to return the cube 1 from any state to its original (i.e. solved) state, in which each face consists of nine squares of a single color.

The edge segments 5 show two colored sides each, and the corner segments 7 have three colored sides. Below, the sides of the segments, 5, 7, 15 that do not have a color, are referred to as interface sides. In the Rubik's cube embodiment, the interface sides are not visible for the user.

According to the invention, the colors of the colored sides of the segments 5, 7, 15 are determined by light modules inside the segments 5, 7, 15. The light modules are arranged to lighten certain parts of the segments 5, 7, 15. In an embodiment, certain parts of the segments 5, 7, 15 will be colored red, green or blue or any combination of the primary colors.

Figure 3:
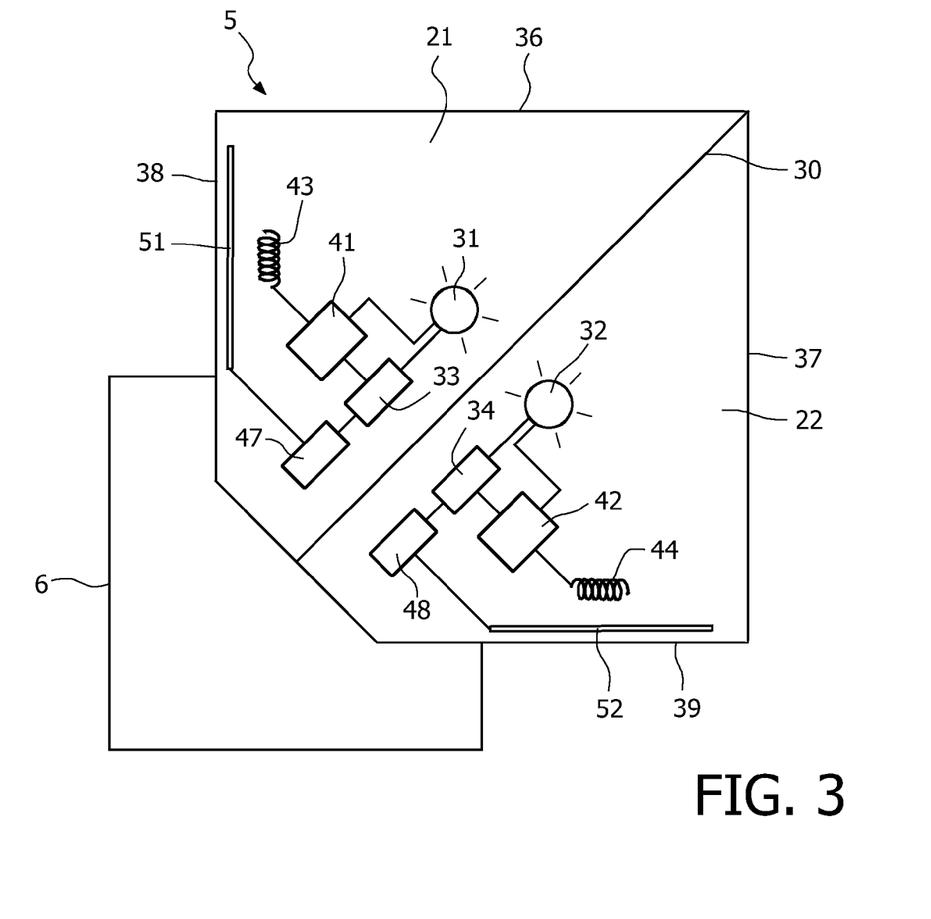
FIG. 3 schematically shows an example of one of the edge segments of the embodiment of FIG. 1.

FIG. 3 schematically shows an example of one of the edge segments 5. The segment 5 comprises an inner wall 30 that divides the edge segment 5 into two compartments or chambers 21, 22. In this way, the colored sides of the segment 5 are optically separated from each other so that each side can display colors independently. The chambers 21, 22 comprise light modules 31, 32 respectively. The light modules 31, 32 preferably comprise light emitting diodes (LEDs), not shown. In an embodiment, the light modules 31, 32 comprise an LED emitting green light, an LED emitting red light and an LED emitting blue light. The light modules 31, 32 are arranged to receive a control signal that is used to turn-on the correct LED(s). In an embodiment, each chamber 21, 22 of the segments 5 comprises a processor 33, 34. The processors 33, 34 are arranged to send control signals to the light modules 31, 32. The processors 33, 34 are powered by a power cell 41, 42. It should be noted that only one local processor could be present in the segment 5 controlling the light modules of two chambers 21, 22.

In an embodiment, each power cell 41, 42 is rechargeable and is connected to a RF receiver 43, 44 to allow wireless charging of the power cells 41, 42. The RF receivers 43, 44 may comprise a coil that inductively receives energy from an electromagnetic charging tool, not shown, known to the skilled reader. Each chamber 21, 22 may also comprise a communication circuit 47, 48 that allows each chamber 21, 22 of a segment 5 to communicate with chambers in other segments and become 'aware' of the neighboring segments. The communication circuits 47, 48 may comprise standard Altera Chips or other microprocessors known to the skilled person. The communication circuit 47, 48 is connected to its respective processor 33, 34 and also connected to a capacitive coupler 51, 52 as shown FIG. 3.

Each capacitive coupler could oscillate at a specific frequency that would be representative of the segment. Upon detecting these frequencies, the processor of a chamber of a segment can get identification information of the neighboring segments. The identification information can be used by the processors to control the color of the respective chambers.

The segment 5 further comprises two transparent (or quasi-transparent) walls 36, 37 which are part of the outer faces of the cube 1 and thus visible to the user. The inner wall 30 may be reflective so that more light produced by the light modules 31, 32 will be directed to the outer walls 36, 37. In this way less energy is needed for the activation of the LEDs. In this embodiment, the interface sides 38, 39 of segments 5 are not transparent so that the radiation of the segment 5 is not influencing the color of a neighboring segment. However, in order to achieve special lighting effects, the interface sides may be transparent or partly transparent as well.

Figure 4:
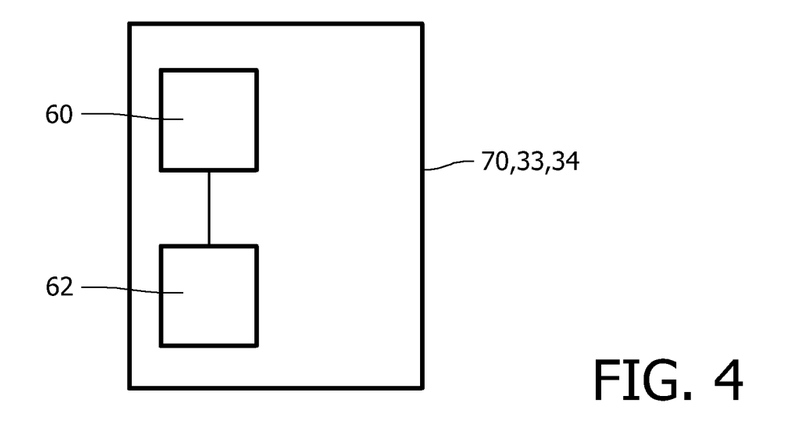
FIG. 4 schematically shows an embodiment of the processor.

FIG. 4 schematically shows an embodiment of the processor 33, 34. The processor 33, 34 comprises a processing unit (CPU) 60 connected to a memory 62. The CPU 60 is arranged to store data and instructions into the memory 62. The processor 33, 34 may receive signals from the communication circuit 47, 48, see FIG. 3, so as to react to a specific situation. For example, the processor 33, 34 may receive a reset command from a neighboring segment, in which case the light modules 31, 32 will be set to an inactive state (e.g. no light). In another situation, the processor 33, 34 may receive for example a 'blue' command coming from a neighboring segment. The processor 33, 34 will then control its corresponding light module 31, 32 accordingly. The processor 33, 34 may well receive more complicated signals such as complete digital data strings representing a set of rules. These data strings may be received from neighboring segments, as well as from a specific external processing interface arranged to transmit data into the segments. The CPU 60 of the processors 33, 34 will store this rules into the memory 62. In this way a programmable puzzle can be realized.

Figure 5:
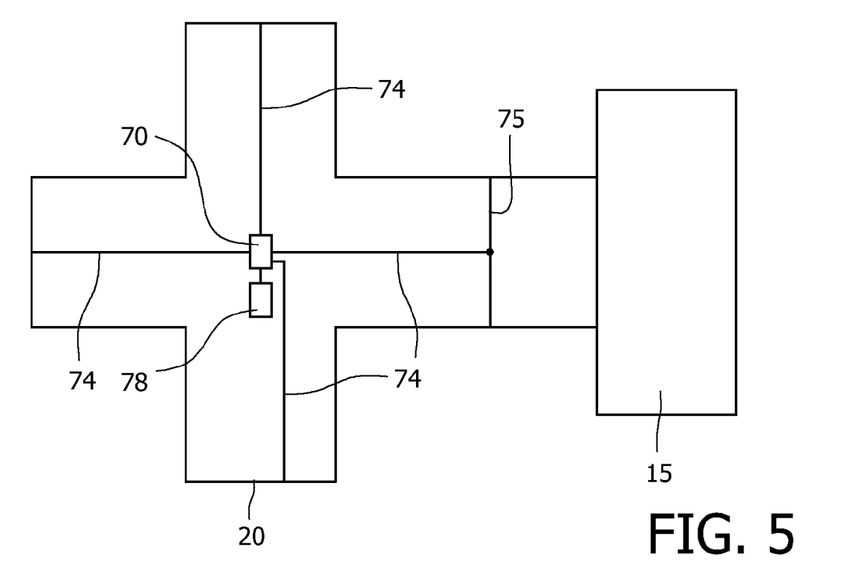
FIG. 5 schematically shows a cross section of one center segment and the core mechanism 20 according to another embodiment of the invention.

FIG. 5 schematically shows a cross section of one center segment 15 and the core mechanism 20 according to another embodiment of the invention. In this embodiment, the intelligence is centrally arranged in the cube 1. The core mechanism 20 of the cube 1 comprises a central processor 70, a central memory and a central power cell 78. In this embodiment, the segments 5, 7, 15 merely comprise one or more light modules arranged to receive control signals. The central processor 70 in the core mechanism 20 is connected to the light modules 31, 32 in the different segments via communication lines. Part of the communication lines inside the core mechanism 20 is depicted as 74 in FIG. 5. The communication lines 74 may comprise one or more wires, depending on the number of segments and light modules to be controlled.

Figure 6:
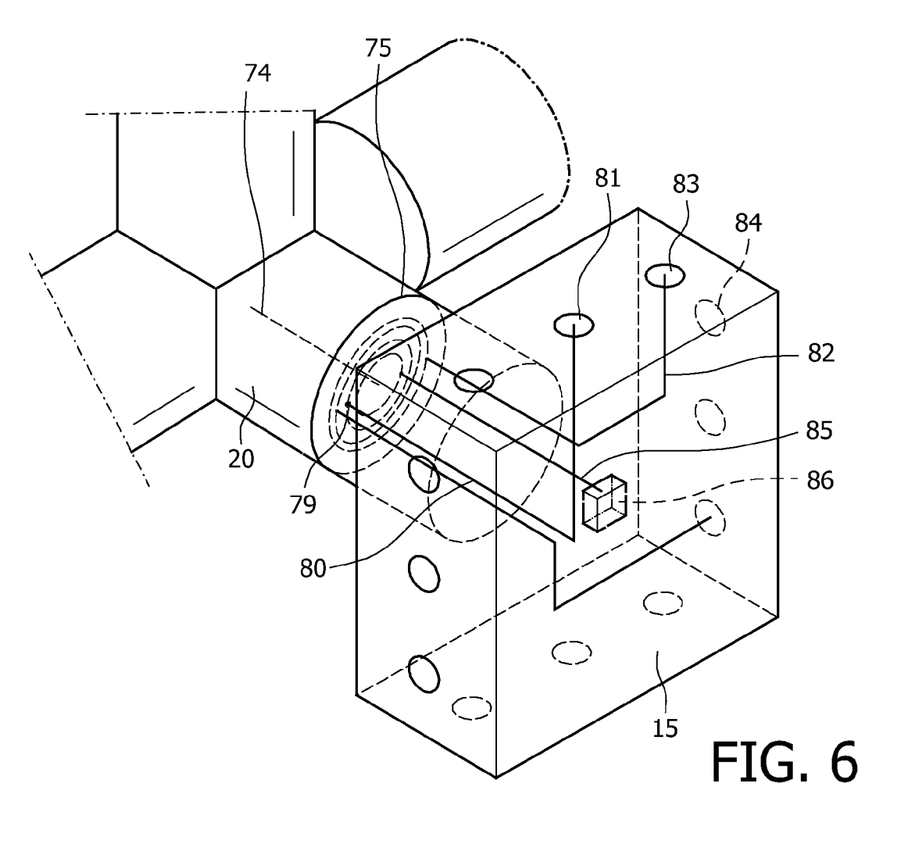
FIG. 6 shows a possible arrangement of the communication lines inside the center segment.

FIG. 6 shows a possible arrangement of the communication lines inside the center segment 15. In this example, the center segment 15 comprises several connections 80, 82, 85 from the interface 75 with the core mechanism 20, see FIG. 5, to the interfaces with the neighboring segments. For reasons of simplicity, not all connections are shown. Connection 80 connects a contact point 79 on the interface 75 with the core mechanism 20 with a contact point 81 on the top of center segment 15. The contact point 79 may be for example a slip contact or any other suitable contact. The slip contact 79 engages a metal ring, not shown, that is connected to an output of the central processor 70. A slip contact is preferred since the center segments 15 needs to be freely rotatable with respect to the core mechanism 20.

As will be clear to the skilled reader, this point of contact 81 is positioned so as to face another contact point present on the neighboring segment, not shown. Via connections like connection 80, the central processor 70 transmits signals to the edge segments 5.

The center segment 15 further comprises a connection 82 leading from the interface with the core mechanism 20 towards the interface at the upper surface of the center segment 15, see contact point 83. The neighboring edge segment just above center segment 15 will have a contact point that faces the contact point 83. It may also have another contact point connected to the same connections 82 for redundancy reasons. The center segment 15 also comprises a connection 85 between the interface with the core mechanism 20 and the light module 86 inside the center segment 15 itself.

Figure 7:
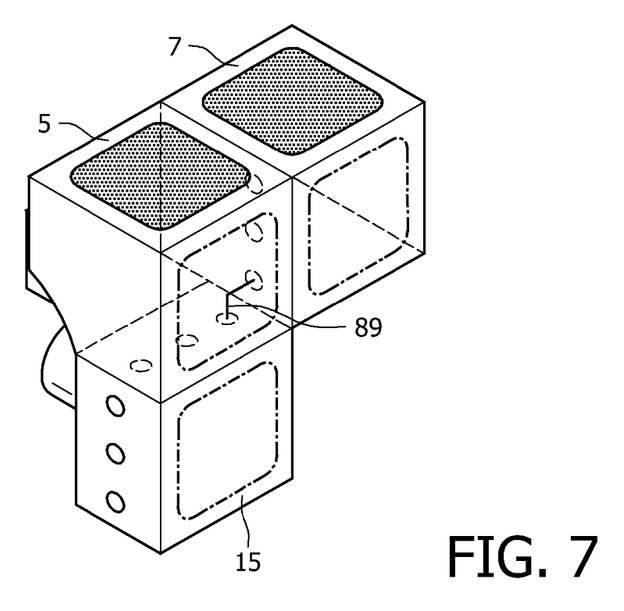
FIG. 7 shows one of the edge segments contacting a center segment, together with one-corner segments according to an embodiment.

FIG. 7 shows one of the edge segments 5, contacting the center segments 15 described above, together with one-corner segments 7. The corner segments 7 do not have an interface with the center segments 15. In order to receive control signals from the central processor 74, the edge segment 5 comprises connections 89 which are arranged to pass signals from the center segments 15 to the chambers of the corner segments 7.

The light modules 31, 32 may be powered by a central power cell 78, see FIG. 5. The power connection between the central power cell 78 and the light modules 31, 32 may be parallel to the communication lines 74, 80, 82, 85. Alternatively, the power connections may be used as communication lines.

The connections 80, 82, 85 may comprise for example copper threads or any other suitable wiring known to the skilled reader. It is noted that instead of hard wired communications lines, the communication between the central processor 70 and the segments 5, 7, 15 may be wireless, by way of a transceiver inside the core mechanism 20. Preferably, each segment 5, 7, 15 comprises a power cell. In that case, there is no need for power lines coming from the core mechanism 20.

Figure 8:
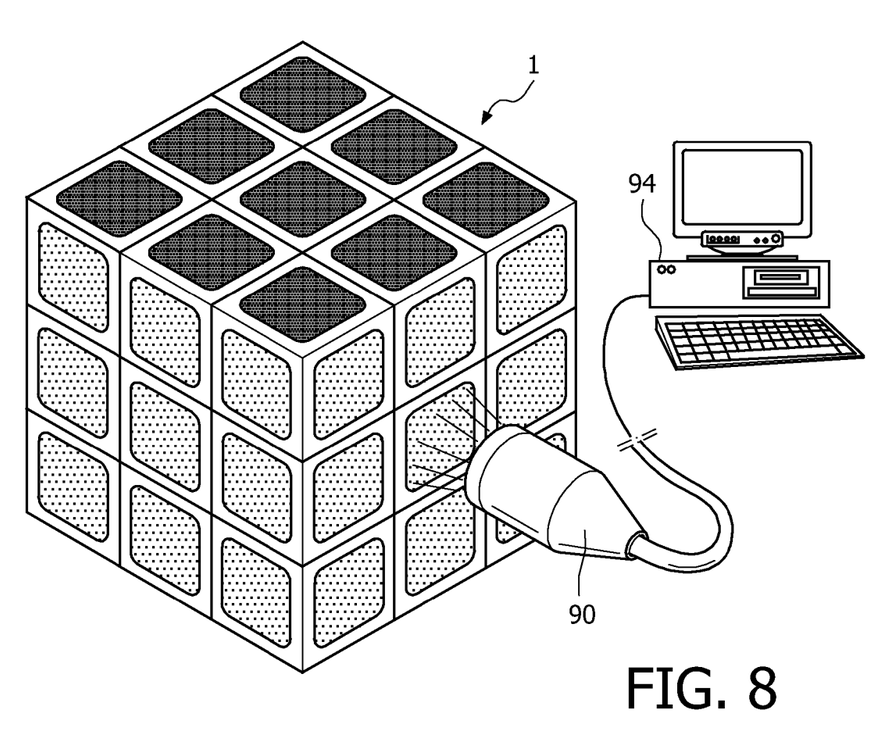
FIG. 8 schematically shows a Rubik's cube embodiment in communication with an external programming tool.

In a particular embodiment, one or more of the segment 5, 7, 15 are arranged to be in communication with an external programming tool 90, see FIG. 8. The programming tool 90 is controlled by a computer 94 arranged to install software onto the cube 1. The programming tool may comprise a capacitive coupler, not shown, by means of which data is transmitted into the cube 1. Programming the cube 1 can be done by storing a set of rules in (E)EPROM memory at the manufacturing of the cube 1. The programming tool 90 and the computer 94 can be used to reprogram the cube 1. This makes it possible, to install new software into the cube 1 enabling new updates and new games.

Since all the colored sides of all the segments 5, 7, 15 can produce a plurality of colors, the puzzle can be set electronically to any state. This allows the following features that are not possible in a static puzzle:

1- The cube 1 can be set to a predetermined starting position from which the user has to achieve the end situation. This predefined start situation does not have to be constant and can be so chosen so as to define the difficulty level, i.e. level I is a start position which only requires one turn of the cube 1 before reaching the solution while level II requires two turns and so on. If the user cannot solve the puzzle it can be reset to its original setting.

2- The difficulty level of the cube 1 can be adjusted by allowing some segments to automatically adjust themselves, i.e. only require the user to arrange a certain number of sides to be of a homogeneous color and adjust the others so they are of one color automatically. Alternatively only three colors could be used in the puzzle instead of six. This increases the number of solutions and so lowers the difficulty level.

3- The cube 1 can be asked to supply hints for achieving the end goal. For example, if the user reaches an impasse then the side that should be moved next can be flashed to indicate the next best move. Asking a hint can for example be achieved by pressing on a colored side of a segment specifically arranged for this purpose.

4- The cube 1 can be arranged to work against the user, e.g. a time limit can be introduced so that the user has to reach the end state within a fixed time frame.

5- When the cube 1 is not being used in the puzzle mode, then it could be connected to the mains via a 12 V adapter and function as an ambient light source of any color. Instead of a fixed color, a random pattern of light and colors may be produced.

Figure 9:
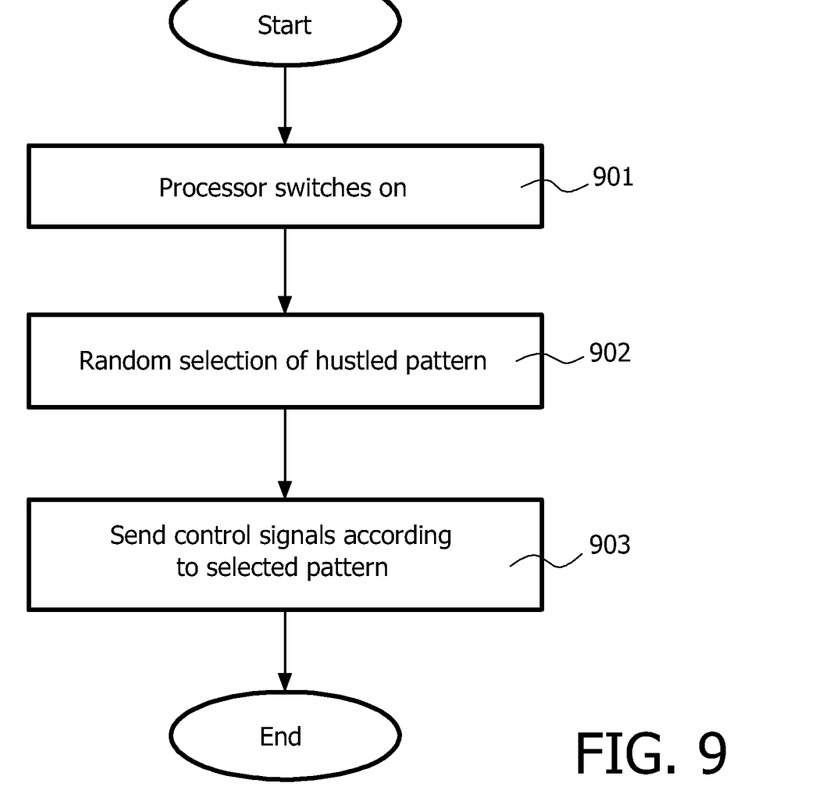
FIG. 9 shows a flow chart of actions to be taken by the central processor according to an embodiment of the invention.

FIG. 9 shows a flow chart of actions to be taken by the central processor 70 according to an embodiment of the invention. In this embodiment, the central processor 70 is controlling all the light modules 31, 32 of all the segments 5, 7, 15 of the cube 1. The central processor 70 is triggered to start a new game for example by way of shaking the cube 1. The core mechanism 20 may comprise a switch that is arranged to detect a movement of the cube 1. If the switch detects a certain acceleration, it switches and can initiate the processor 70. Other configuration may be conceivable like for example a remote control switching on the central processor 70.

At a step 901 the central processor 70 switches on. Then in a step 902, the central processor 70 reads a color pattern of the cube 1 representing a hustled cube. Several color patterns may be stored in the memory 62 of the central processor 70. The central processor 70 randomly selects one of the stored patterns. Next in a step 903, the central processor 70 sends control signals to the light modules 31, 32 of all the segments 5, 7, 15. The light modules 31, 32 are arranged to produce the colors depending on the control signals sent by the central processor 70. In this simple embodiment, the central processor 70 will end its task. Now a user can rotate the different faces of the cube 1, in order to solve the puzzle. If the puzzle is solved, the user will notice.

Figure 10:
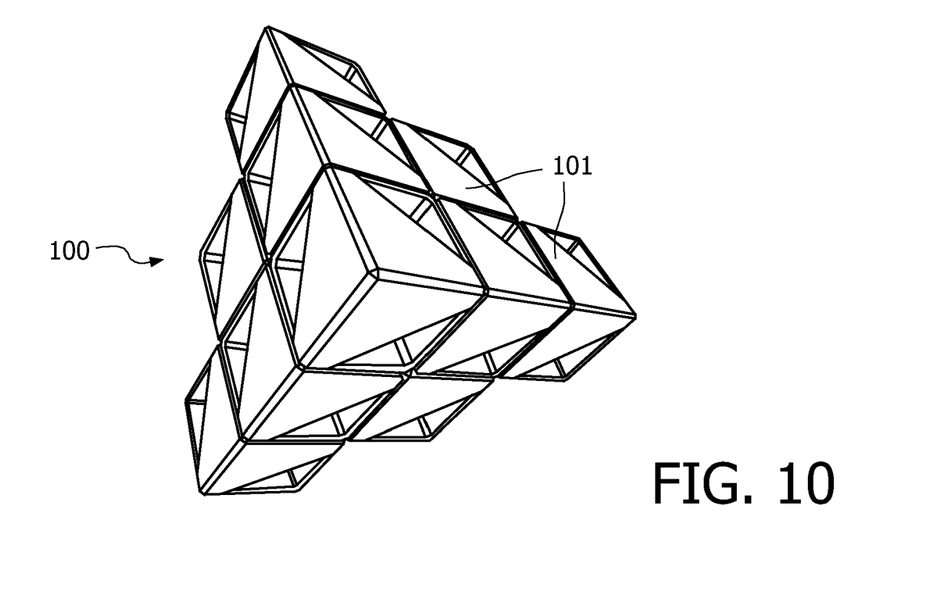
FIG. 10 shows an example of a 3D pyramid embodiment.

In yet another embodiment of the game there is no central stationary section. An example of such an embodiment is a 3D puzzle made of segments forming the well-known 3D pyramid configuration mentioned above. FIG. 10 shows an example of the 3D pyramid puzzle 100. In this embodiment, the light modules, power cells, and processors are integrated into each chamber of each segment 101. The processors in the chambers are arranged to store patterns and to communicate with processors of other chambers.

In an embodiment, all the segments 5, 7, 15 have power cells and are electrically linked together via contact wires so that the total power from the cells in the segment is shared. Dispersing the power attainable from the power cells over all the segment 5, 7, 15 like this prevents some segments dimming faster than others.

In an embodiment, communication between the segments is realized via modulation techniques over the power lines.

Figure 11:
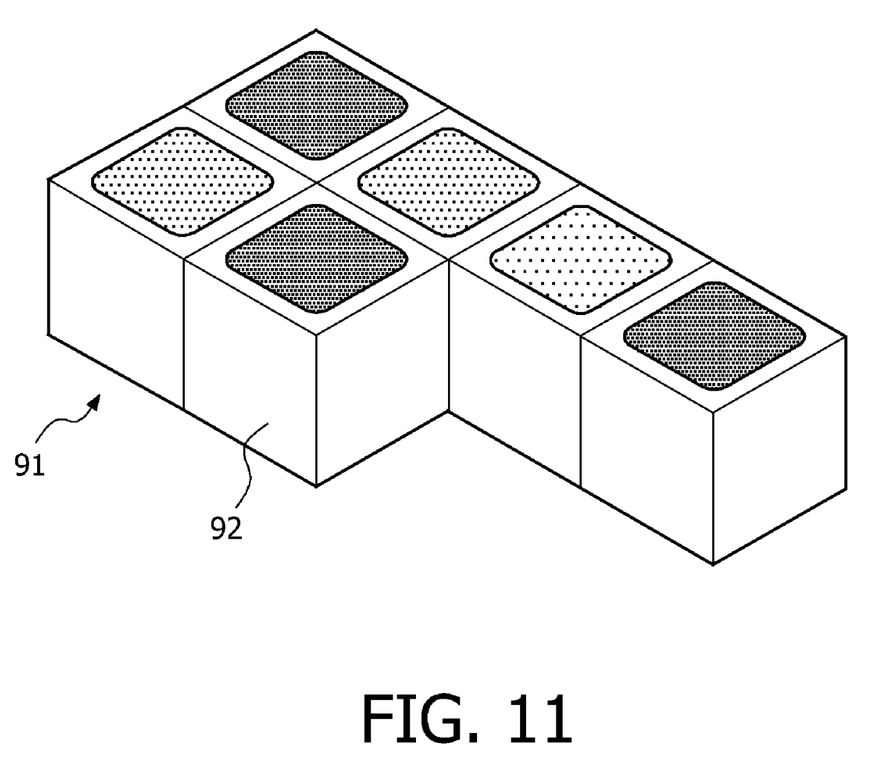
FIG. 11 shows a 2D example.

In another embodiment, the invention relates to a 2D puzzle. An example of such a puzzle is shown in FIG. 11. The puzzle 91 comprises a plurality of tiles 92. Preferably, the tiles 92 each contain a power source and means for communication. As in the 3D-puzzle the aim may be to create a homogenous color. This, however, is only achievable by placing the tiles in a certain order. For example, first the tiles 92 communicate with each other and assign numbers. The numbers are not visible to the user. The simplest puzzle is that the user has to work out the numbers of the tiles 92 and place them in ascending order. Alternatively the tiles 92 could be programmed only to turn a certain color if placed in a repetitive sequence, such as two odd numbers and then one even. There are many other possibilities of mathematical number sequences that could be used as the end goal. Since all the tiles 92 can be set to all the colors then this could also be exploited. For example, all tiles 92 have to be turned white but this can only be done by placing red, green and blue together in a particular sequence.

Alternatively, the color of an added tile can be a function of the new neighbors (and they might change as well). The most simple is to create a puzzle where the color of added tiles is simply a mix of the neighboring tiles e.g. one red and one blue makes two purple tiles. Example with six colors: Red (1), purple (2), blue (3), cyan (4), green (5), yellow (6). Place purple (2) next to green (5) and the new colors get closer to each other: purple (2) gets blue (3) and the green (5) gets cyan (4). The difficulty level of this game can be easily varied. If the new function/algorithm is not disclosed, part of the puzzle is to figure out how the tiles are reacting to each other (finding the rules). This in itself can be quite intriguing. Rather than homogeneous surfaces other patterns, or low-resolution images can also be used as the end-goal of the puzzle.

Another feature of such a puzzle is that it is possible that each cube could recognize its neighbors and be able to apply a simple (set of) rules. A set of rules can be compared to the set of instructions self-organizing (mini) robots get (keywords: swarm behavior, genetic algorithm, hormonal software). Finding out the rules and making new objects (even surprising ones) can be as much fun as solving a puzzle.

Many of the possibilities discussed for the Rubik's cube mentioned above, can also be applied in this embodiment as well. The software for controlling the behavior of the tiles can be updated to create new games/challenges for the same hardware. A light source you just have to play with comparable to the GeoMag game wherein a person puts some tiles on a table and other people will play with it and leave a nice looking result.

In an embodiment, a special segment is arranged to turn the game on or off. This dedicated segment will be recognized and turn all segments to a standby mode. Alternatively, the dedicated segment will turn off all segments after for example 10 minutes without any detected changes. These detected changes could be in a memory of the segments or in a specific central memory arranged in a central unit such as the core mechanism 20 shown in FIG. 5.

While the invention has been described in connection with preferred embodiments, it will be understood that modifications thereof within the principles outlined above will be evident to those skilled in the art. The invention is not limited to the preferred embodiments but is intended to encompass such modifications. Furthermore, the invention is not restricted to segments having flat surfaces. It may well be used to manufacture marbles emitting light wherein the marbles interact if they get close to each other. The scope of the invention is only determined by the accompanying claims, wherein any reference signs used in the claims are not construed as limiting the scope of the invention.

The invention claimed is:

1. A game comprising:
a plurality of segments, each segment comprising a housing and a light module arranged inside said housing and configured to receive a control signal and to emit light of a color that is dependent on said control signal; and
a central processor configured to control said light modules and to provide a hint to continue the game in response to a request for the hint, wherein the request for the hint includes pressing a predetermined side of a segment,
wherein at least one segment of the plurality of segments has a plurality of processors,
wherein each of said segments comprises a transceiver configured to transmit to and receive signals from other segments, and
wherein said transceiver comprises a capacitive coupler, and wherein the capacitive coupler is configured to oscillate at a predetermined frequency that is representative of the segment.

2. The game according to claim 1, wherein said segments can be rearranged in a certain order so as to solve a puzzle.

3. The game according to claim 2, wherein said game is a 3-dimensional puzzle.

4. The game according to claim 3, further comprising a core, wherein said plurality of segments comprises 26 separate segments and said core mechanism is configured to hold together the 26 segments.

5. The game according to claim 1, wherein said light module comprises at least two light emitting diodes configured to radiate light of different colors.

6. The game according to claim 1, wherein each of said plurality of segments comprises a battery.

7. The game according to claim 6, wherein said battery is a rechargeable battery.

8. The game according to claim 1, wherein said central processor comprises a memory configured to store game rules.

9. The game according to claim 1, wherein said central processor is configured to receive an input signal indicative of at least one of a reset of the game, the request for the hint, a trigger to start another game and a command for turning off the game.

10. The game according to claim 1, wherein said central processor is configured to be programmed by a user by way of an external programming tool.

11. The game of claim 1, wherein central processor is further configured to provide the hint by flashing a light module at a side that should be moved.

12. The game of claim 1, wherein central processor is further configured to change a difficulty level of the game at a beginning of a play period.

13. The game of claim 1, wherein central processor is further configured to changes a difficulty level of the game during a play period.

14. The game of claim 1, wherein each segment comprises two contacts for contacting two neighboring contact points of a neighboring segment for providing redundant paths of communication between processors of neighboring segments.

15. The game of claim 1, wherein each segment includes a battery, and wherein the plurality of segments are electrically linked together via contact wires so that a total power from batteries of the plurality of segments in the segment is shared by the plurality of segments.

16. A game comprising:
a plurality of segments, each segment comprising a housing and a light module arranged inside said housing and configured to receive a control signal and to emit light of a color that is dependent on said control signal; and
a central processor configured to control said light modules and to provide a hint to continue the game in response to a request for the hint, wherein the request for the hint includes pressing a predetermined side of a segment,
wherein at least one segment of the plurality of segments has a plurality of processors, and
wherein each segment comprises contacts for connecting neighboring segments to each other for communication between processors of the neighboring segments, and wherein a color of a segment is changed to be a mix of colors of the neighboring segments.

17. A game comprising:
a plurality of segments, each segment comprising a housing and a light module arranged inside said housing and configured to receive a control signal and to emit light of a color that is dependent on said control signal; and
a central processor configured to control said light modules and to provide a hint to continue the game in response to a request for the hint, wherein the request for the hint includes pressing a predetermined side of a segment,
wherein at least one segment of the plurality of segments has a plurality of processors, and
wherein the at least one segment of the plurality of segments has a plurality of chambers, and wherein each chamber of the plurality of chambers has one processor of the plurality of processors.

\* \* \* \* \*